(12) United States Patent
Luttjehuizen et al.

(10) Patent No.: US 12,478,087 B2
(45) Date of Patent: Nov. 25, 2025

(54) SYSTEM AND PROCESS FOR INSERTING A SKEWER INTO A FOOD PRODUCT AND FOR SPIRALLY CUTTING SAID FOOD PRODUCT

(71) Applicant: Luttjehuizen Holding B.V., Dongen (NL)

(72) Inventors: Robert Luttjehuizen, Dongen (NL); Karel Van Der Leegte, Dongen (NL)

(73) Assignee: Luttjehuizen Holding B.V., Dongen (NL)

( * ) Notice: Subject to any disclaimer, the term of this patent is extended or adjusted under 35 U.S.C. 154(b) by 179 days.

(21) Appl. No.: 18/568,659

(22) PCT Filed: Jun. 8, 2022

(86) PCT No.: PCT/NL2022/050315
§ 371 (c)(1),
(2) Date: Dec. 8, 2023

(87) PCT Pub. No.: WO2022/260515
PCT Pub. Date: Dec. 15, 2022

(65) Prior Publication Data
US 2024/0268437 A1     Aug. 15, 2024

(30) Foreign Application Priority Data
Jun. 8, 2021 (NL) .................... 2028406

(51) Int. Cl.
*A23P 10/10* (2016.01)
*B26D 1/00* (2006.01)
(Continued)

(52) U.S. Cl.
CPC ............ *A23P 10/10* (2016.08); *B26D 1/0006* (2013.01); *B26D 1/285* (2013.01); *B26D 3/11* (2013.01);
(Continued)

(58) Field of Classification Search
CPC ....... A23P 10/10; B26D 1/0006; B26D 1/285; B26D 3/11; B26D 2001/0046; B26D 2210/02
See application file for complete search history.

(56) References Cited

U.S. PATENT DOCUMENTS 4,818,556 A * 4/1989 Hoashi ................. A23L 19/115
426/104
5,167,177 A * 12/1992 Cimperman ............. B26D 3/11
83/423

(Continued)

FOREIGN PATENT DOCUMENTS

| CN | 108312203 A | 6/2021 |
|----|-------------|--------|
| NL | 2023607 B1 | 2/2021 |
| WO | 2016086265 A1 | 6/2016 |

OTHER PUBLICATIONS

International Search Report and Written Opinion for PCT Application No. NL2022/050315, mailed Sep. 16, 2022.
(Continued)

*Primary Examiner* — Omar Flores Sanchez
(74) *Attorney, Agent, or Firm* — Andrus Intellectual Property Law, LLP

(57) ABSTRACT

The invention relates to a system and process for producing a spiral food product on a skewer, such as twister potato. The system thereto comprising a clamping element for clamping the food product, a guiding structure for guiding a skewer towards the centre region of the clamped food product, a pusher for pushing the skewer away from the guiding structure such that the skewer pierces the food product and a rotatable knife for cutting the food product in a spiral manner.

20 Claims, 5 Drawing Sheets

(51) Int. Cl.
*B26D 1/28* (2006.01)
*B26D 3/11* (2006.01)
(52) U.S. Cl.
CPC .. *B26D 2001/0046* (2013.01); *B26D 2210/02* (2013.01)

(56) References Cited

U.S. PATENT DOCUMENTS

| | | | | |
|---|---|---|---|---|
| 5,167,178 | A * | 12/1992 | Cimperman | B26D 7/10 83/171 |
| 5,293,803 | A * | 3/1994 | Foster | B26D 1/0006 83/672 |
| 2007/0251399 | A1* | 11/2007 | Van Heerden | B26D 3/11 99/596 |
| 2010/0071528 | A1* | 3/2010 | Viereck | B26B 27/00 30/90.1 |
| 2012/0090480 | A1* | 4/2012 | Caspar | B26D 3/11 99/537 |
| 2016/0207212 | A1* | 7/2016 | Rogers | B26D 7/06 |
| 2018/0220828 | A1* | 8/2018 | Conti | B26D 3/26 |
| 2020/0282582 | A1* | 9/2020 | Hofmann | E21B 4/06 |
| 2023/0390954 | A1* | 12/2023 | Hartmann | B26D 1/0006 |
| 2024/0234784 | A1* | 7/2024 | Kim | B26D 1/0006 |
| 2024/0342939 | A1* | 10/2024 | Scalerandi | B26D 7/2621 |

OTHER PUBLICATIONS

Search Report for Netherlands Patent Application No. 2028406, dated Feb. 10, 2022.

* cited by examiner

SYSTEM AND PROCESS FOR INSERTING A SKEWER INTO A FOOD PRODUCT AND FOR SPIRALLY CUTTING SAID FOOD PRODUCT

CROSS-REFERENCE TO RELATED APPLICATIONS

This is a national stage application filed under 37 U.S.C. 371 based on International Patent Application No. PCT/NL2022/050315, filed Jun. 8, 2022, which claims priority to Netherlands Patent Application No. 2028406, filed on Jun. 8, 2021, the disclosures of which are incorporated herein by reference in their entireties.

The invention relates to a system for inserting a skewer into a food product, in particular a potato, and for spirally cutting said food product. The invention also relates to the use of said system. The invention further relates to a process for inserting a skewer into a food product, in particular a potato, and for spirally cutting said food product.

How a consumer experiences the taste of a food product does not only depend on the ingredients, but also, for example, on the temperature and structure of the food product. The design and presentation of food product(s) can also make a major contribution to the consumer's taste perception. An example of a food product that is generally perceived as both visually attractive and tasty is a so-called twister potato. A twister potato is a potato which is cut in a spiral manner and divided over a skewer. A succession of potato slices is thus obtained which extends over the skewer. The spiralized potato on the skewer, or the twister potato, can be subsequently baked and seasoned, after which it is ready for consumption. Due to the handy positioning of the potato on the skewer, it is easy to consume without the need for cutlery or the consumer having to touch the food with his fingers, which makes the product particularly suitable as a snack during an event. Several techniques are now known for how a potato, or other food product, can be cut spirally in an efficient manner. However, clamping the food product on the skewer remains a difficult process. Tensioning the food product in such a way that a consistent sequence of food slices is obtained without damaging the food product is a challenge. Usually, both the insertion of the skewer into the food product and dividing of spirally cut food product on the pin is done manually. In addition to the fact that it requires practice and routine to be able to achieve this, manual clamping is extremely time-consuming. There are also disadvantages from a hygienic point of view to manually clamping the food product on the skewer, since direct contact with the food is unavoidable.

It is an object of the invention to overcome at least part of the above difficulties in the process of making a spirally cut food product on a skewer.

The invention provides thereto a system for inserting a skewer into a food product, in particular a potato, and for spirally cutting said food product, the system comprising:
- at least one clamping element for (temporarily) clampingly engaging, and/or centering, at least one food product, in particular a potato, in a predetermined position;
- at least one guiding structure for guiding a skewer towards the clamping element and/or towards the centre region of the clamped food product;
- at least one pusher for pushing the skewer away from and/or out of the guiding structure such that the skewer pierces the food product;
- at least one rotatable knife for cutting the food product; and
- at least one gripper for gripping at least part of a distal end of the skewer;

wherein the rotatable knife and the gripper are mutually displaceable such that the food product can be cut in a spiral configuration whilst increasing the mutual distance between the rotatable knife and the gripper causes that the spirally cut food product can be divided over the skewer.

The system according to the present invention enables that the production process of making a spiral food product on a skewer, such as twister potato, can be at least partially automated. The system is basically configured for making a spiral food product on a skewer. Where putting the food product on a skewer is conventionally done in a manual step, the combination of the clamping element, the guiding structure and the pusher enable that a skewer can be pushed into the food product in an mechanical manner. The guiding structure and the clamping element are typically positioned such that a skewer positioned upon, or held by, the guiding structure will be centrally outlined with respect to a food product which is clamping engaged by the clamping element. The pusher can subsequently be applied to push the skewer away from the guiding structure and in particular such that the skewer will be pushed into the food product. The guiding structure is in particular configured to guide the direction of displacement of the skewer, which is in particular in a longitudinal direction. The pusher is typically configured such that the skewer will fully protrude trough the food product, in particular such that a first distal end of the skewer which is pierced through the food product can be gripper by the gripper. Once the food product is positioned upon the skewer the co-action between the rotatable knife and the gripping element enable the cutting and spiralization step of the food product. Since the rotatable knife and the gripper are mutually displaceable, the substantially simultaneous rotation of the knife and mutual displacement between the rotatable knife and the gripper cause that the food product is cut in a spiral configuration and the spirally cut food product is divided, or pulled, over the skewer. The rotatable knife and the gripper are thereto in particular at least mutually displaceable in a direction away from each other such that the food product can be cut in a spiral configuration and the spirally cut food product can be pulled over the skewer.

The skewer is typically substantially longitudinal. The skewer can for instance be at least partially formed by a pin, spit or a stick. The skewer can be manufactured from several types of material, such as for example but not limited to wood, metal, plastic and/or combination thereof. It is also conceivable that the skewer is made of a consumable material, such as for example licorice-, cinnamon- and/or seaweed-based material.

In a preferred embodiment, the rotatable knife is stationary positioned within the system and the gripper is displaceable with respect to the rotatable knife. The gripper is in particular displaceable with respect to the rotatable knife in an axial direction. Said displacement is in particular in a longitudinal direction of the skewer. Since the rotatable knife is substantially stationary, the rotatable knife can be operated in a relatively stable and reliable manner. The rotational speed of the rotatable knife and the displacement of the gripper can preferably be independently controlled, for example by means of a control unit. The gripper typically grips a distal end of the skewer which is pierced through the food product. The gripper is then in particular configured to displace the skewer in a direction facing away from the rotatable knife such that the cut parts of food product are basically pulled beyond, or through, the knife. The rotational speed of the rotatable knife and the displacement of the gripper are typically controlled such that the spirally cut food product is divided over substantially the entire length of the skewer. It is also conceivable that the system comprising at least one housing. The rotatable knife can then be stationary positioned within the housing.

In a beneficial embodiment, the pusher and the gripper are positioned at opposite sides of the rotatable knife. This enables subsequent performing the process step wherein the skewer is pushed into the food product and the step wherein the food product is cut and divided over the skewer is a relatively simple and efficient manner. The gripper can grip the distal end of the skewer which was first inserted into the food product and which extends with respect to the food product. The gripper could optionally be provided with cutting element to cut at least part of the skewer. This can be useful in case the skewer would have a sharp end which is undesired to have in the final product.

The clamping element is configured to engage the food product, in particular in a clamping manner. The clamping engagement is configured to temporarily engage the food product, at least during the skewer being pushed into the food product. Preferably the clamping engagement between the clamping element and the food product is released and/or overcome prior to or during the mutual displacement between the rotatable knife and the gripper. The clamping element is preferably configured to engage at least part of a circumferential edge of the food product. The clamping element is in particular applied to control the position of the food product, in particular such that outlining of at least the guiding structure with respect to the food product (and thus the clamping element) can be achieved. It is also conceivable that the clamping element is applied to control the position of the food product such that outlining of at least one gripper and/or the rotatable knife with respect to the food product can be achieved. The clamping element is preferably configured to engage the food product in a non-invasive manner. In this way, damage of the food product can be prevented. It is also conceivable that the system comprises multiple clamping elements, for example at least two.

The clamping element may be configured such that the clamping engagement between the clamping element and the food product is released and/or overcome prior to, or during, the mutual displacement between the rotatable knife and the gripper. The clamping element may for example comprise multiple, substantially flexible arms which are configured to engage the food product. It is in particular beneficial if at least some of the flexible arms, and preferably all flexible arms, bend substantially inwardly, in particular towards each other. At least some of the flexible arms may define a receiving space for receiving the food product. The insertion direction of the food product is preferably in line with the (forward) direction of the inward bend. The flexible arms may for example define part of a sphere or hemisphere. The flexible arms are in a preferred embodiment made of steel, in particular spring steel. Steel, such as spring steel, is relatively strong without compromising on its flexible character. The flexible arms are in a preferred embodiment configured such that the food product which is clampingly engaged by the flexible arms can be pulled, or pushed, through the flexible arms when an initial resistance of the flexible arms is overcome. It is also conceivable that the clamping element is a mechanical clamping element. The clamping element may for example comprise a clamping ring which can be opened and substantially closed. In the closed position, the mechanical clamping element clampingly engaging the food product.

The at least one guiding structure can be configured for guiding a skewer towards the clamping element, in particular such that the skewer is guided towards the centre region, or (longitudinal) central axis, of the food product clamped by the clamping element. The structure is typically configured to substantially support at least one skewer. At least part of guiding structure is preferably substantially longitudinal. In this way the guiding structure can co-act with a (longitudinal) skewer in an efficient manner. It is also beneficial if at least part of the guiding structure defines a receiving space for receiving at least part of the skewer. In this way, the guiding structure can provide a protective function for the skewer. This embodiment may also contribute to an improved co-action between the guiding structure and the skewer. At least part of the guiding structure may for example be substantially cylindrical. This is beneficial as skewers are typically substantially cylindrical wherefore the guiding structure being substantially cylindrical may contribute to an efficient guidance of the skewer. In a preferred embodiment, the guiding structure is at least partially cylindrical and said guiding structure comprises a longitudinal slit over the length of the cylinder. The guiding structure may for example have a substantially u-shaped cross section or an open circular cross section. The guiding structure being at least partially cylindrical and comprising a longitudinal slit over the length of the cylinder enables that a skewer can be received within a receiving space defined by the cylinder and that the skewer can enter and/or leave the receiving space via the longitudinal slit. It is beneficial if the guiding structure is displaceable. It is for example conceivable that the guiding structure is displaceable in an axial and/or longitudinal direction. It is also conceivable that the guiding structure is rotatable.

The pusher is typically displaceable with respect to the guiding structure and/or with respect to the clamping element. The pusher is configured for pushing the skewer away from, or out of, the guiding structure, typically in a longitudinal direction of the skewer, such that the skewer pierces the food product. It is conceivable that the pusher and the clamping element are mutually displaceable, in particular in a direction towards each other. The pusher is preferably displaceable with respect to the clamping element, in particular in case the clamping element is in a predetermined position. It is conceivable that the clamping element is displaceable within the system and that the clamping element can be temporarily fixated at at least one predetermined position within the system. It is for example conceivable that the clamping element is displaceable between at least a receiving location wherein a food product will be received within the clamping element and a cutting location wherein the food product is released from clamping engagement of the clamping element in order to be cut in a spiral configuration.

In a preferred embodiment of the system, the rotatable knife is stationary positioned within the system, or housing if applied, and the pusher is displaceable with respect to the rotatable knife, in particular in an axial direction or parallel thereto. The pusher is for example displaceable in a longitudinal direction of the skewer. It is also conceivable that the pusher makes use of an air flow, in particular in order to push the skewer into the food product. The pusher may for example make use of a pressurized air flow. The pusher can be configured to displace at least one skewer via pressurized air. When it is referred to at least one pusher, it is also conceivable that a device configured to displace at least one skewer via pressurized air is meant. The flow of (pressurized) air can be directed such that, during use, it will push the skewer away from the guiding structure such that the skewer pierces the food product.

The rotatable knife typically comprising at least one cutting element. This can be a substantially linear and/or straight cutting element. The rotatable knife may further comprise an engagement surface for engagement of part of the food product. The engagement surface can support by dividing the cut food product over the skewer. The engagement surface can be configured to contact at least part of the food product during cutting of the food product and during the mutual displacement of the rotatable knife and the gripper. In case both an engagement surface and a cutting element are applied, it is conceivable that the cutting element is positioned substantially under an angle with respect to the engagement surface. The rotatable knife preferably comprises a through hole through which the skewer can be guided and/or led through. The through hole is preferable present at a central region of the rotatable knife. The through hole can for example be present at or near the rotational axis of the rotatable knife. It is conceivable that the rotatable knife defines an receiving space from a peripheral edge of the rotatable knife to the through hole. The receiving space can for example function as (side) entrance for the skewer to enter the through hole and/or for the food product to be centrally positioned with respect to the rotatable knife.

The gripper is preferably configured to engage at least part of a distal end of the skewer. In this way, the skewer can be efficiently and effectively gripped. The gripper may comprise at least one gripping member for gripping at least part of a distal end of the skewer. In a preferred embodiment, the gripper comprises at least two gripping members. The gripper members can be configured for mutual co-action for gripping at least part of a distal end of the skewer. The presence of gripping members can enhance and/or further control the gripping action of the gripper. It is also conceivable that the gripper is configured to cut at least part of the skewer. This is for example beneficial if the skewer comprises a (sharp) point which is pierced through the food product. The gripper may thereto comprise at least one cutting member.

The gripper can for example be displaceable over, or via, a linear rail and/or a linear track. In this way, the gripper can be displaced in a substantially linear manner. This is beneficial as it will positively contribute to the process wherein the food product is divided over the skewer. The system may comprise at least one (electrical) drive to regulate the displacement of the gripper. Preferably the rotational speed of the rotational knife and the (axial) displacement of the gripper can be independently controlled.

In a preferred embodiment, the system comprises at least one support surface for supporting the food product. Preferably, at least part of the clamping element is connected to said support surface. In this way, a co-action between the support surface and the clamping element can be obtain in a relatively simple manner. The support surface can support the food product whilst being clampingly engaged. The clamping engagement can be relatively mild in case the support surface contributes to the overall support of the food product (in particular during the clamping engagement). The support element can also contribute to the outlining of the food product with respect to the skewer and/or the rotatable knife, or vice versa. The support surface can in particular be configured for supporting a single food product. At least part of the support surface can for example have a substantially hollow shape. In a further embodiment, the system comprises at least one displacer for displacing the food product onto the support surface. The displacer can be configured to supply food products to the support surface. It is also conceivable that the displacer is applied in an embodiment without a support surface, and wherein the displacer is configured to displace the food product into the clamping element. It is beneficial if the system comprises at least one substantially cylindrical knife for cutting at least part of the diameter of the food product. The substantially cylindrical knife is preferably positioned prior to the support surface such that when the displacer displaced the food product onto the support surface at least part of the diameter of the food product is cut. In this way, the diameter of the food product can be cut into a preferred dimension prior to the actual spiral cutting of the food product takes place. It is beneficial for the diameter of the food product to match a predetermined standard in order to be able to produce uniform products. The displacer can for example be a pushing element configured to displace the food product in a pushing manner. Preferably, the displacer is configured to displace the food product in a non-invasive manner, in particular without damaging the food product. The system may further comprise two substantially parallel positioned knifes, wherein each knife is configured to cut a distal edges of the food product. The support surface and the parallel positioned knifes are preferably mutually displaceable. It is in particular conceivable that mutual displacement of the support surface and the parallel positioned knifes causes at least one and possibly two distal ends of the food product to come into contact with a knife such that part of said distal end is cut. The edge(s) of the food product can be cut whilst the food product is clamped by the clamping element. It is also conceivable that the clamping element and the parallel positioned knifes are mutually displaceable. It is beneficial for the size of the food product to match a predetermined standard in order to be able to produce uniform products and to ensure that the food product has a sufficient size for being divided over the skewer.

In a preferred embodiment, the system comprises multiple support surfaces which are positioned upon a rotational carrousel. The carrousel is configured to transport the food product from a first initial position wherein the skewer is inserted into the food product to a spiralization position wherein the food product is spirally cut. In this way the placement of the skewer and the spiral cutting of the food product can be done in an efficient manner. Such configuration also enables that different steps of the process can be done simultaneously for different food products. It would in particular be beneficial if the two substantially parallel positioned knifes are positioned along the rotational carrousel, such that the distal end(s) of the food products are cut during displacement of the rotational carrousel. The parallel positioned knifes can be stationary positioned within the system. This embodiment is in particular beneficial if the rotatable knife is positioned substantially stationary within the system. The rotatable knife can for example be positioned substantially below the initial position wherein the skewer is inserted into the food product.

In a further embodiment, the system comprises at least one conveyor configured to transport food products in a separated manner. The conveyor can for example comprise a plurality of support elements, wherein each support element is configured to support a single food product. The support element can be positioned at a predetermined distance from each other. Part of each support element may have a substantially cylindrical shape, preferably wherein the length direction of the cylinder is substantially perpendicular to transport direction of the conveyor. It is beneficial if the system comprises a conveyor for transporting food products in a separated manner as this may enable easy supply of food products to the part of the system where the food products will be processed. The presence of a conveyor also contributes to further automation of the overall process of the process and system according to the present invention. The conveyor can for example form a track for transporting food products. The displacer, if applied, can be configured to displace food products from the conveyor, or a support element thereof, to the support surface and/or clamping element. The system may comprise at least one vibrating unit for subjecting the conveyor to at least one vibration, in particular such that the food product(s) present upon the conveyor will align in a predetermined configuration. Basically, the vibrating unit can cause the conveyor to shake the food products such that they will align in a length direction of the at least partially cylindrically shaped support elements.

The system may also comprise at least one reservoir for retaining or holding a plurality of food products. Preferably, the system further comprises at least one, preferably at least partially vertically oriented, transport belt, wherein the transport belt comprises a plurality of dishes wherein each dish is configured to hold a single food product and wherein the transport belt is configured to transport said food product to the conveyor. The transport belt may comprise a plurality of dishes which are positioned at a predetermined distance from each other. The transport belt may be an endless transport belt. It is conceivable that the direction of transportation of the transport belt differs from the direction of transportation of the conveyor. The transport belt may be configured to transport the food product(s) in a substantially vertical manner. The dishes may have a substantially rounded back side configured to act as an guiding member for the food product towards the conveyor.

The reservoir may for example comprise at least one movable wall. It was experimentally found that food products, and in particular potatoes, may get stuck or blocked within the reservoir. The use of a reservoir comprising at least one movable wall could positively contribute to preventing food products from getting blocked within the reservoir. It is for example conceivable that at least one side wall of the reservoir is configured to oscillate.

The system could also comprise at least one supply unit for supplying skewers, in particular to the guiding structure. The system, and in particular the supply unit, may comprise at least one reservoir for holding a plurality of skewers. The system is preferably configured such that skewers are individually supplied to the guiding structure.

The system typically comprises multiple electrically driven components. Typically, at least the pusher, the rotatable knife and the gripper are electrically driven. It is also conceivable that one or more of the further components are electrically driven, such as the conveyor and/or the transporter, if applied. The support surface, if applied, may be electrically driven too. The system may comprise at least one electrical drive unit, such as but not limited to an electrical motor. It is beneficial if the system comprises at least one control unit configured to at least control the rotation of the rotational knife and the mutual displacement between the rotatable knife and the gripper. It is also conceivable that the control unit is configured to control the displacement of the pusher. The control unit can be further configured to control the further electrically driven components of the system.

The invention also relates to the use of a system according to the present invention.

The invention further relates to a process for inserting a skewer into a food product, in particular a potato, and for spiral cutting said food product, in particular by making use of a system according to the present invention, the process comprising the steps of:
clampingly engaging at least one food product by means of a clamping element;
outlining at least one skewer with respect to the clamped food product by means of a guiding structure;
pushing the skewer away from the guiding element such that the skewer pierces the food product;
gripping a distal end of the skewer, in particular the distal end which is pierced through the food product by means of a gripper; and
mutually displacing the gripper and a rotatable knife, in particular in a direction away from each other, such that the food product is cut in a spiral configuration whilst increasing the mutual distance between the rotatable knife and the gripper causes that the spirally cut food product is divided over the skewer.

The method can further comprise any of the above described steps for as possibly applied in the system according to the present invention. Pushing of the skewer may be done a flow of (pressurized) air. The method may also comprise any of the steps of displacing the food product onto a support surface by means of at least one displacer, cutting at least part of the diameter of the food product by means of at least one substantially cylindrical knife, cutting at least one distal edge of the food product by means of a knife, preferably cutting two distal edges by means of two substantially parallel positioned knifes, transport food products in a separated manner by means of at least one conveyor configured, subjecting the conveyor to a vibration in particular by means of at least one vibrating unit, transporting at least one food product from a reservoir to the conveyor in particular via at least one (vertically oriented) transport belt and/or supplying skewers from a supply unit to the guiding structure.

The invention will be further elucidated by means of the following non-limitative clauses.

1. System for inserting a skewer into a food product, in particular a potato, and for spirally cutting said food product, the system comprising:
at least one clamping element for clampingly engaging at least one food product in a predetermined position;
at least one guiding structure for guiding a skewer towards the centre region of the clamped food product;
at least one pusher for pushing the skewer away from the guiding structure such that the skewer pierces the food product;
at least one rotatable knife for cutting the food product; and
at least one gripper for gripping at least part of a distal end of the skewer;
wherein the rotatable knife and the gripper are mutually displaceable such that the food product can be cut in a spiral configuration whilst increasing the mutual distance between the rotatable knife and the gripper causes that the spirally cut food product can be divided over the skewer.

2. System according to clause 1, wherein the rotatable knife is stationary positioned within the system and wherein the gripper is displaceable with respect to the rotatable knife, in particular in an axial direction.

3. System according to any of the previous clauses, wherein the pusher and the gripper are positioned at opposite sides of the rotatable knife.

4. System according to any of the previous clauses, wherein the clamping element comprises multiple substantially flexible arms which are configured to engage the food product.

5. System according to clause 4, wherein at least some of the flexible arms, and preferably all flexible arms, bend inwardly towards each other.

6. System according to clause 4 or 5, wherein the flexible arms are made of steel.

7. System according to any of the previous clauses, wherein at least part of the guiding structure is substantially longitudinal.

8. System according to any of the previous clauses, wherein at least part of the guiding structure defines a receiving space for receiving at least part of the skewer.

9. System according to any of the previous clauses, wherein the guiding structure is at least partially cylindrical.

10. System according to clause 9, wherein the guiding structure comprises a longitudinal slit over the length of the cylinder.

11. System according to any of the previous clauses, wherein the guiding structure is rotatable.

12. System according to any of the previous claims, wherein the rotatable knife is stationary positioned within the system and wherein the pusher is displaceable with respect to the rotatable knife, in particular in an axial direction.

13. System according to any of the previous clauses, wherein the rotatable knife comprises an engagement surface for engagement of part of the food product.

14. System according to any of the previous clauses, wherein the rotatable knife comprises a through hole through which the skewer can be guided.

15. System according to any of the previous clauses, wherein the gripper comprises at least one gripping member for gripping at least part of a distal end of the skewer.

16. System according to any of the previous clauses, comprising at least one support surface for supporting the food product, wherein at least part of the clamping element is connected to said support surface.

17. System according to clause 16, comprising at least one displacer for displacing the food product onto the support surface.

18. System according to clause 17, comprising at least one substantially cylindrical knife for cutting at least part of the diameter of the food product, wherein the substantially cylindrical knife is positioned prior to the support surface such that when the displacer displaced the food product onto the support surface at least part of the diameter of the food product is cut.

19. System according to any of clauses 16-18, comprising two substantially parallel positioned knifes wherein each knife is configured to cut a distal edge of the food product and wherein the support surface and the parallel positioned knifes are mutually displaceable.

20. System according to any of the previous clauses, comprising at least one conveyor configured to transport food products in a separated manner.

21. System according to clause 20, comprising at least one vibrating unit for subjecting the conveyor to a vibration.

22. System according to clause 20 or 21, comprising at least one reservoir for retaining or holding a plurality of food products and at least one transport belt, wherein the transport belt comprises a plurality of dishes wherein each dish is configured to hold a single food product and to transport said food product to the conveyor.

23. System according to any of the previous clauses, comprising at least one supply unit for supplying skewers to the guiding structure.

24. System according to any of the previous clauses, comprising at least one control unit configured to control the rotation of the rotational knife and the mutual displacement between the rotatable knife and the gripper.

25. Use of a system according to any of the previous clauses.

26 Process for inserting a skewer into a food product, in particular a potato, and for spiral cutting said food product, in particular by making use of a system according to any of clauses 1-24, the process comprising the steps of:
- clampingly engaging at least one food product by means of a clamping element;
- outlining at least one skewer with respect to the clamped food product by means of a guiding structure;
- pushing the skewer away from the guiding element such that the skewer pierces the food product;
- gripping a distal end of the skewer, in particular the distal end which is pierced through the food product by means of a gripper; and
- mutually displacing the gripper and a rotatable knife, in particular in a direction away from each other, such that the food product is cut in a spiral configuration whilst increasing the mutual distance between the rotatable knife and the gripper causes that the spirally cut food product is divided over the skewer.

The invention will be further elucidated by means of non-limiting exemplary embodiments illustrated in the following figures, in which.

Within these figures, similar reference numbers correspond to similar or equivalent elements or features.

Figure 1A:
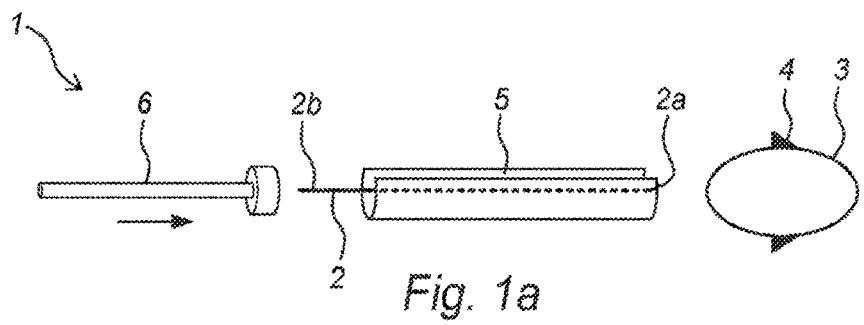
FIGS. 1a-1d shows a sequence of the process according to the invention when using a system according to the present invention.

FIGS. 1a-1d shows a sequence of a possible process according to the present invention when using a system 1 according to the present invention. The system 1 and process are configured for inserting a skewer 2 into a food product 3 and for spirally cutting said food product 3. The system 1 comprises a clamping element 4 for clampingly engaging and centering the food product 3, a guiding structure 5 for guiding the skewer 2 towards the centre region of the clamped food product 3, a pusher 6 for pushing the skewer 2 away from the guiding structure 5, a rotatable knife 7 for cutting the food product 3 and a gripper 8 for gripping at least part of a distal end of the skewer 2. The rotatable knife 7 and the gripper 8 are mutually displaceable such that the food product 3 can be cut in a spiral configuration whilst increasing the mutual distance between the rotatable knife 7 and the gripper 8 such that the spirally cut food product 8 can be divided over the skewer 2.

In the shown figures, the food product 3 applied is a potato 3. In the shown embodiment, part of the guiding structure 5 is substantially cylindrical and comprises a longitudinal slit over the length of the cylinder. The guiding structure 5 being at least partially cylindrical and comprising a longitudinal slit over the length of the cylinder enables that a skewer 2 can be received within a receiving space defined by the cylinder and that the skewer 2 can enter and/or leave the receiving space via the longitudinal slit.

The system 1 comprises a clamping element 4 for clampingly engaging at least one food product 3 in a predetermined position. The clamping element 4 holds the food product 3 such that the food product 3 can be pulled out of the clamping element 4 by a relatively low force, such that the right balance is there for holding the food product 3 in its place while being pierced but also for not damaging the upper surface of the food product 3 while being cut and pulled out of the clamping element 4 (FIG. 1d). The clamping element 4 could thereto for example comprise a plurality of flexible arms. The system 1 further comprises at least one guiding structure 5 for guiding a skewer 2 towards the centre region of the clamped food product 3 and one pusher 6 for pushing the skewer 2 away from the guiding structure 5 such that the skewer pierces the food product, this step is shown in FIG. 1b. In this embodiment the food product 3 is pierced by a blunt end 2a of the skewer 2 (and not the sharp end 2b). In the view as shown in FIGS. 1c and 1d, it is visible that the system 1 further comprises a rotatable knife 7 for cutting the food product 3 and at least one gripper 8 for gripping at least part of a distal end of the skewer 2. The rotatable knife 7 and the gripper 8 are mutually displaceable. In the shown embodiment, the gripper 8 moves substantially linearly towards the rotatable knife 7 in the direction A to grip part of the distal end, near the blunt end 2a of the skewer 2. The rotatable knife 7 and the gripper 8 are mutually displaceable, in particular in a direction B away from each other, such that the food product 3 can be cut in a spiral configuration 9 and the spirally cut food product is divided over the skewer 2 with a predetermined spit, predetermined by determining the velocity of the movement of the gripper 8 in the direction B.

Figure 1B:
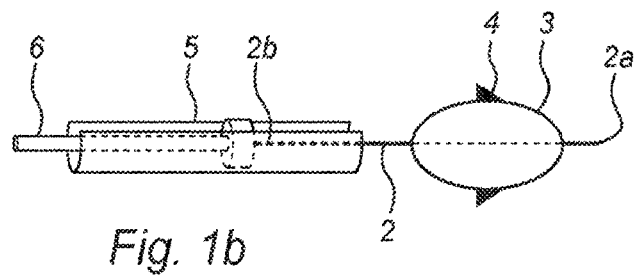
Figure 1C:
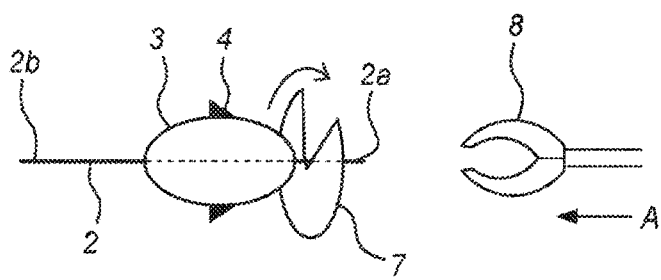
Figure 1D:
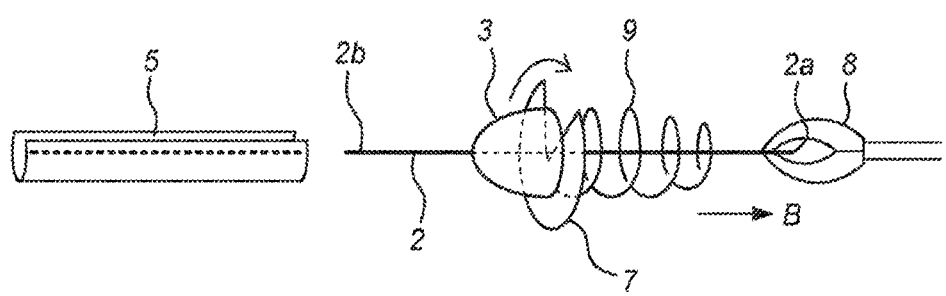

FIGS. 1a-1d basically show the process steps for inserting a skewer 2 into a food product 3 and for spiral cutting said food product 3, in particular by making use of a system 1 according to the present invention. FIG. 1a shows the food product 3 being clampingly engaged by means of the clamping element 4. The skewer 2 is outlined with respect to the clamped food product 3 by means of the guiding structure 5. FIG. 1b shows that the skewer 2 is pushed away from the guiding element 5 by the pusher 6 such that the skewer 2 pierces the food product 3. The food product 3 is pierced while being held in its place by a clamping element 4. FIG. 1c shows that the food product 3 is positioned upon the skewer 2, whilst still being clampingly engaged by the clamping element 4. A rotatable knife 7 is present for the subsequent cutting steps. Before the cutting step is performed, the distal end of the skewer 2 which is pierced through the food product 3 is gripped by the gripper 8. In the figure shown, the gripper 8 is in its initial place. FIG. 1d shows subsequently that mutually displacement of the gripper 8 and the rotatable knife 7 in a direction away from each other causes that the food product 3 is cut in a spiral configuration and the spirally cut food product 3 is divided over the skewer 2. In the shown embodiment, the clamping engagement performed by the clamping element 4 is overcome by the force applied by the gripper 8. However, it is also conceivable that the clamping engagement of the clamping element 4 is (mechanically) removed.

Figure 2:
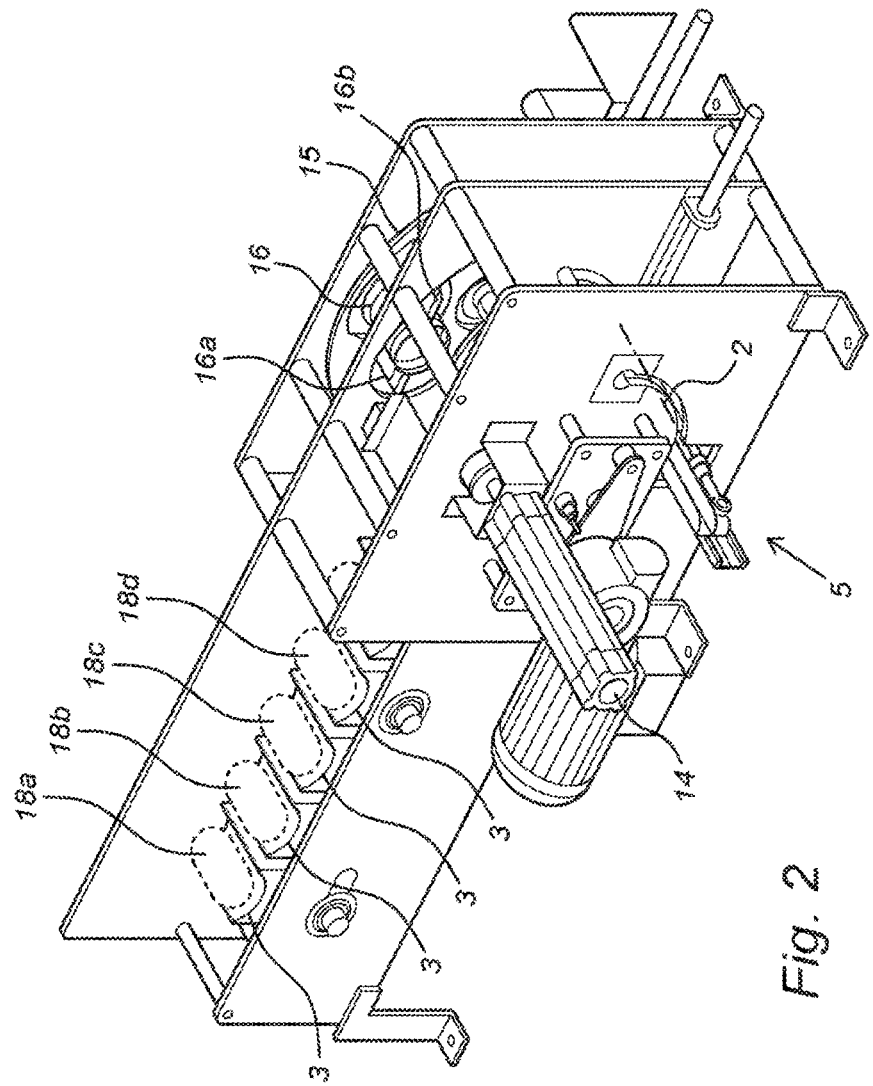
FIG. 2 shows a perspective view of a part of an embodiment of the system according to the invention.

FIG. 2 shows a perspective view of a part of a possible embodiment of the system 1 according to the present invention. The system 1 as shown comprises a conveyor which is configured to transport the food products 3 in a separated manner. The conveyor comprises multiple food product conveyor elements 18a, 18b, 18c, 18d, or support elements 18a, 18b, 18c, 18d, which are each in particular configured to keep and/or support a single food product 3. The system 1, and in particular the conveyor, comprises a vibrating unit (not visible) for subjecting the food product conveyor elements 18a, 18b, 18c, 18d to a vibration. Use of the vibrating unit may contribute to alignment of the food products 3 in a predetermined configuration, in particular in a length direction of the at least partially cylindrically shaped food product conveyor elements 18a, 18b, 18c, 18d.

The food products 3 are transported to an operation wheel 15, or rotational carrousel 15. In the shown embodiment, the operation wheel 15 comprises four positions wherein clamping elements 4 are present. The position of the clamping elements 4 are equally divided over each quarter of the operation wheel 15. Three consecutive positions correspond to three operating positions which will be explained further. In this operation wheel 15 several operations take place, first the food product 3 is moved by a second pusher 14 from a conveyor element 18a, 18b, 18c, 18d through a circular cutting element 16, such that the food product 3 is cut to a predetermined circumference, with a predetermined diameter. The food product is pushed into a clamping element 4 which holds the food product 3 in its place in the operation wheel 15. After this operation the operation wheel 15 is turned by 90 degrees and in this movement the food product 3 is cut to a predetermined length by two cutting elements (one of which shown in front view of FIG. 3). The excess food product 3 is cut in two parts by the lateral cutting elements 16a, 16b. In the second position, a skewer 2 will be pierced into the food product after this cutting operation. This is typically done by means of a pusher which co-acts with a guiding structure 5. It is beneficial if the guiding structure 5 is substantially cylindrical and comprises a longitudinal slit over the length of the cylinder, for example as shown in FIG. 1a. The guiding structure 5 being at least partially cylindrical and comprising a longitudinal slit over the length of the cylinder enables that the skewer 2 can enter and/or leave the receiving space 5 via the longitudinal slit. It is conceivable that the guiding structure 5 is rotated after the skewer 2 has been inserted in the food product 3 in order to create a pathway for the skewer 2 via the longitudinal slit. After this operation the operation wheel 15 turns another 90 degrees and moves the pierced food product 3 which is on a skewer 2 to third operation position where the spiral cut operation step takes place, using a rotatable knife. This spiral cut operation is explained further in FIG. 3. The skewer 2 is gripped by a gripper (not shown) and by movement of the gripper the skewer 2 is moved out of the clamping element 4 and in the direction of the axis of the circular rotatable knife, while the food product 3 is cut and a spiraling configuration of the food product 3 is formed around the skewer.

Figure 3:
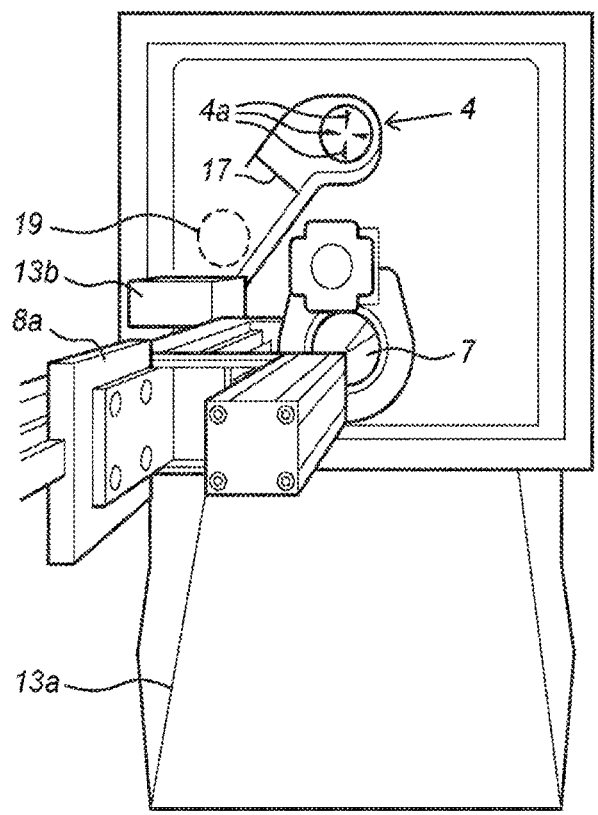
FIG. 3 shows a front view of a part of an embodiment of the system according to the invention.

FIG. 3 shows a front view of a part of an embodiment of the system 1 as shown in FIG. 2. The front view shows the operation wheel 15 behind a cover plate. The figure shows a clamping element 4 in a first operating position in the operation wheel 15 as described in FIG. 2. The clamping element 4 comprises multiple flexible arms 4a which are configured to temporarily retain the food product 3. While the operation wheel 15 is turned from the first to the second position, the food product 3 is cut by cutting element 17 to cut the food product 3 at a predetermined length. Excess food product which is cut away is guided towards disposal areas by guiding structures 13a, 13b. The second position of the food product 3 in the operation wheel 15 is shown with dashed lines 19. There the product 3 is pierced with a skewer. During these steps, the food product 3 is still clampingly engaged by the clamping element 4, and in particular by the flexible arms 4a thereof. In the third position, the food product 3 is cut by the rotatable knife 7. The back of the gripper 8 is shown, which is connected to the linear gripper guiding element 8a. This step was already schematically shown in FIG. 1. The clamping element 4, and in particular the flexible arms 4a thereof are configured such that the food product 3 can be pulled out of the clamping element 4 by a relatively low force (applied by the gripper) during displacement of the gripper 8 with respect to the rotatable knife 7.

Figure 4:
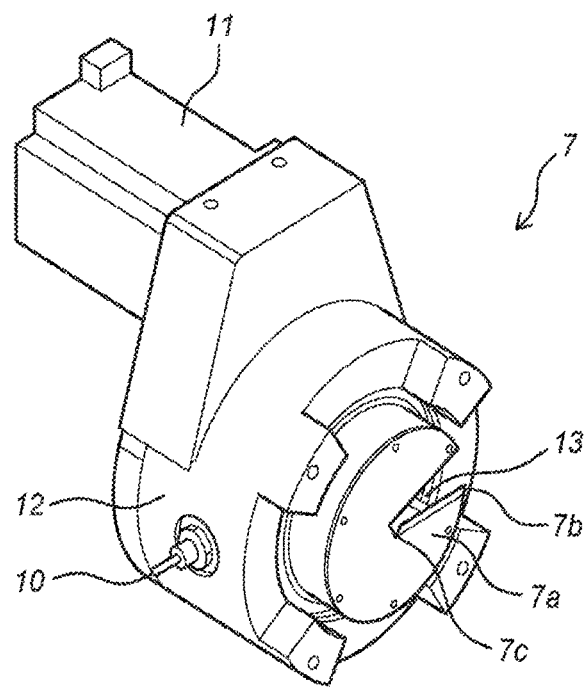
FIG. 4 shows a perspective view of an embodiment of a rotatable knife for use in a system according to the invention.

FIG. 4 shows a perspective view of an embodiment of a rotatable knife 7 for use in a system 1 according to the present invention. In the shown embodiment, the system 1 comprises a housing 12 wherein the rotatable knife 7 is stationary positioned. The rotatable knife 7 comprises an engagement surface 7a, a sharp edge 7b which extends from the through hole 7c to the circumference of the knife blade for cutting the pierced food product 3 and said through hole 7c through which a skewer can be guided. The knife blade comprises an engaging surface 7a for support of the food product during cutting (not shown). The knife's sharp edge 7b is positioned in between the engagement surface 7a and a gap 13. The gap 13 serves to allow the cut food product to move forward and form a spiralled configuration over the skewer. The gap 13 is foreseen as a receiving space 13 which extends from a peripheral edge of the rotatable knife 7 to the through hole 7c thereof. The receiving space 13 can for example function as (side) entrance for the skewer to enter the through hole 7c. The rotatable knife 7 is driven by a drive 11, such as an electric motor 11 at a predetermined speed. The rotatable knife 7 typically has a starting position which is useful for creating a consistent spiralled product by the system according to the invention. Before and in between cutting operations the rotatable knife 7 is positioned in the starting position. An inductive sensor 10 serves to notice if a food product is present. If there is no food product present (anymore) the rotatable knife 7 is rotated (back) to its starting position.

Figure 5:
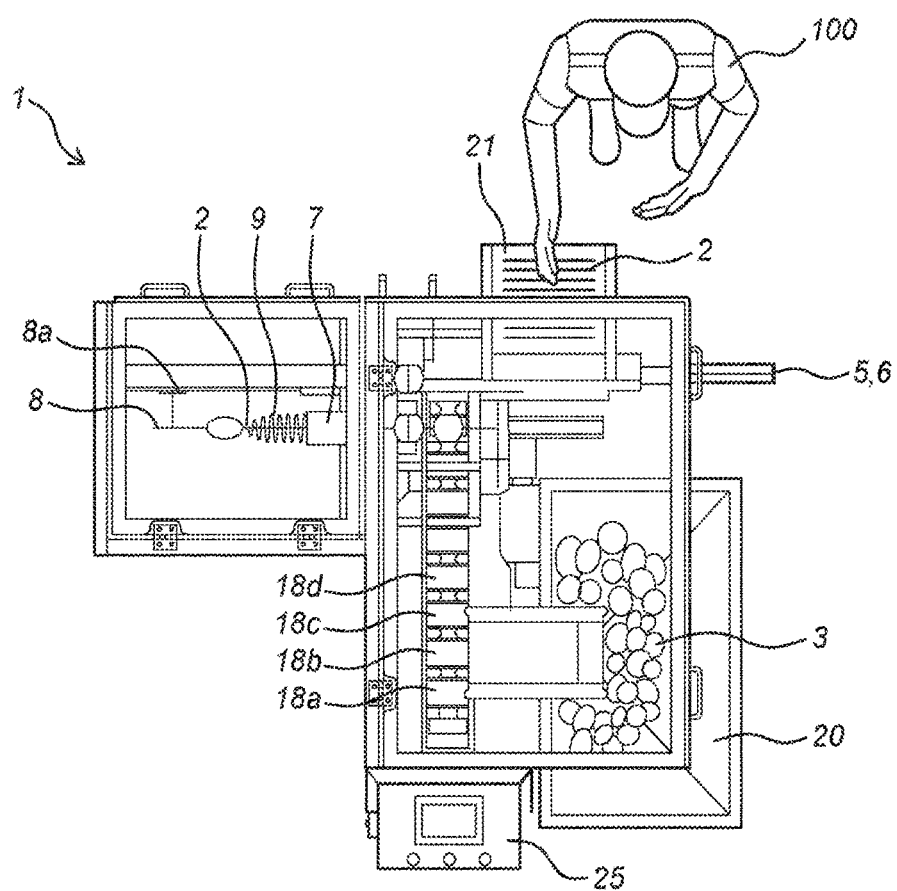
FIG. 5 shows a top view of an embodiment of a system according to the invention.
Figure 6:
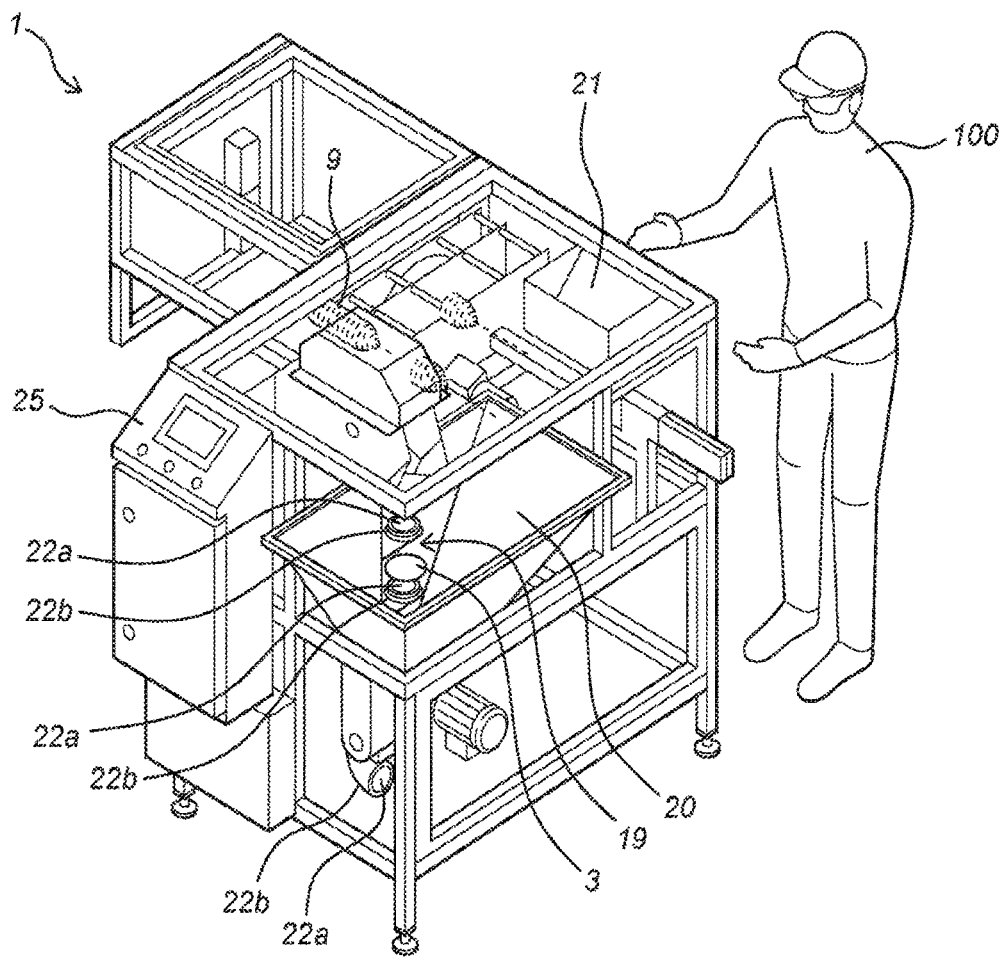
FIG. 6 shows a perspective view of the system as shown in FIG. 5.

FIG. 5 shows a top view of a possible embodiment of the system 1 according to the invention wherein a person 100 is operating the system 1. The system 1 may overlap with the systems 1 described in the previous figures. The person 100 is standing next to the system 1, in a position where he/she can supply the system 1 with skewers 2 in the skewer supply funnel 21. It is conceivable that this step will be further automated in the future. The system 1 comprises a food product supply container 20, food product conveyor elements 18a, 18b, 18c, 18d to transport and position the food products 3 properly. FIG. 6 shows how the food products 3 can be transported from the food product supply container 20 to the food product conveyor elements 18a, 18b, 18c, 18d. The figure shows a guiding structure 5 wherein a pusher 6 is accommodated. The figure also shows the rotatable knife 7 in a cutting position, a potato is being spirally cut in this view. The rotatable knife 7 is also positioned near the operation wheel 15 as shown in previous figures. The spiraled configuration 9 of the food product 3 over the skewer 2 is shown, while the gripper 8 has grip of a distal end of the skewer 2. The gripper 8 moves linearly along a gripper guidance 8a. The system 1 is further provided with a controlling module and user interface 25.

FIG. 6 shows a perspective view of an embodiment of the system 1 as shown in FIG. 5. In this view it is possible to show the supply line of the food products 3. The supply container 20 is provided with a vertically oriented transport belt 19, or uplifting system 19, which comprises multiple dishes 22, or lifting elements 22. Each dish 22 is configured to hold a single food product 3 and the transport belt 19 is configured to transport said food product 3 to the food product conveyor elements 18a, 18b, 18c, 18d of the (horizontally oriented) conveyor. The supply container 20 is filled with food products 3, such as crude potatoes 3, which are from there supplied to further system elements via the uplifting system 19. Each dish 22, or lifting element 22, comprises an engaging surface 22a, and an aligning surface 22b. The engaging surfaces 22a carry the food products 3 which are in the container 20 during displacement of the vertically oriented transport belt 19. The aligning surfaces 22b aid the guidance and aligning of the food products 3 onto the conveyor elements 18a, 18b, 18c, 18d. The system 1 further comprises a controlling module and user interface 25.

It will be clear that the invention is not limited to the exemplary embodiments which are illustrated and described here, but that countless variants are possible within the framework of the attached claims, which will be obvious to the person skilled in the art. In this case, it is conceivable for different inventive concepts and/or technical measures of the above-described variant embodiments to be completely or partly combined without departing from the inventive idea described in the attached claims.

The verb 'comprise' and its conjugations as used in this patent document are understood to mean not only 'comprise', but to also include the expressions 'contain', 'substantially contain', 'formed by' and conjugations thereof.

The invention claimed is:

1. A system for inserting a skewer into a food product and for spirally cutting said food product, the system comprising:
   at least one clamping element for clampingly engaging at least one food product in a predetermined position;
   at least one guiding structure for guiding a skewer towards the centre region of the clamped food product;
   at least one pusher for pushing the skewer away from the guiding structure such that the skewer pierces the food product;
   at least one rotatable knife for cutting the food product; and
   at least one gripper for gripping at least part of a distal end of the skewer;
   wherein the rotatable knife and the gripper are mutually displaceable such that the food product can be cut in a spiral configuration whilst increasing the mutual distance between the rotatable knife and the gripper causes that the spirally cut food product can be divided over the skewer.

2. The system according to claim 1, wherein the rotatable knife is stationary positioned within the system and wherein the gripper is displaceable with respect to the rotatable knife.

3. The system according to claim 1, wherein the pusher and the gripper are positioned at opposite sides of the rotatable knife.

4. The system according to claim 1, wherein the clamping element comprises multiple substantially flexible arms which are configured to engage the food product.

5. The system according to claim 4, wherein at least some of the flexible arms bend inwardly towards each other and/or wherein the flexible arms are made of steel.

6. The system according to claim 1, wherein at least part of the guiding structure is substantially longitudinal.

7. The system according to claim 1, wherein at least part of the guiding structure defines a receiving space for receiving at least part of the skewer.

8. The system according to claim 1, wherein the guiding structure is at least partially cylindrical and wherein the guiding structure is rotatable.

9. The system according to claim 1, wherein the rotatable knife is stationary positioned within the system and wherein the pusher is displaceable with respect to the rotatable knife, in particular in an axial direction.

10. The system according to claim 1, wherein the rotatable knife comprises an engagement surface for engagement of part of the food product.

11. The system according to claim 1, wherein the rotatable knife comprises a through hole through which the skewer can be guided.

12. The system according to claim 1, wherein the gripper comprises at least one gripping member for gripping at least part of a distal end of the skewer.

13. The system according to claim 1, comprising at least one support surface for supporting the food product, wherein at least part of the clamping element is connected to said support surface and/or comprising at least one displacer for displacing the food product onto the support surface.

14. The system according to claim 10, comprising at least one substantially cylindrical knife for cutting at least part of the diameter of the food product, wherein the substantially cylindrical knife is positioned prior to the support surface such that when the displacer displaced the food product onto the support surface at least part of the diameter of the food product is cut.

15. The system according to claim 10, comprising two substantially parallel positioned knifes wherein each knife is configured to cut a distal edge of the food product and wherein the support surface and the parallel positioned knifes are mutually displaceable.

16. System The system according to claim 1, comprising at least one conveyor configured to transport food products in a separated manner and comprising at least one vibrating unit for subjecting the conveyor to a vibration.

17. The system according to claim 16, comprising at least one reservoir for retaining or holding a plurality of food products and at least one transport belt, wherein the transport belt comprises a plurality of dishes wherein each dish is configured to hold a single food product and to transport said food product to the conveyor.

18. The system according to claim 1, comprising at least one supply unit for supplying skewers to the guiding structure and/or comprising at least one control unit configured to control the rotation of the rotational knife and the mutual displacement between the rotatable knife and the gripper.

19. Process for inserting a skewer into a food product and for spiral cutting said food product, process comprising the steps of:
   clampingly engaging at least one food product by means of a clamping element;
   outlining at least one skewer with respect to the clamped food product by means of a guiding structure;
   pushing the skewer away from the guiding element such that the skewer pierces the food product;
   gripping a distal end of the skewer, in particular the distal end which is pierced through the food product by means of a gripper; and
   mutually displacing the gripper and a rotatable knife, in particular in a direction away from each other, such that the food product is cut in a spiral configuration whilst increasing the mutual distance between the rotatable knife and the gripper causes that the spirally cut food product is divided over the skewer.

20. Process for inserting a skewer into a food product and for spiral cutting said food product by making use of a system according to claim 1, the process comprising the steps of:
   clampingly engaging at least one food product by means of a clamping element;
   outlining at least one skewer with respect to the clamped food product by means of a guiding structure;
   pushing the skewer away from the guiding element such that the skewer pierces the food product;
   gripping a distal end of the skewer, in particular the distal end which is pierced through the food product by means of a gripper; and
   mutually displacing the gripper and a rotatable knife, in particular in a direction away from each other, such that the food product is cut in a spiral configuration whilst increasing the mutual distance between the rotatable knife and the gripper causes that the spirally cut food product is divided over the skewer.

* * * * *

UNITED STATES PATENT AND TRADEMARK OFFICE
CERTIFICATE OF CORRECTION

PATENT NO. : 12,478,087 B2  
APPLICATION NO. : 18/568659  
DATED : November 25, 2025  
INVENTOR(S) : Robert Luttjehuizen and Karel Van Der Leegte It is certified that error appears in the above-identified patent and that said Letters Patent is hereby corrected as shown below:

In the Claims

Column 15, Line 42 of Claim 16:
"System The system according to claim 1…"
Should instead read:
--The system according to claim 1…--

Column 16, Line 11 of Claim 19:
". . . said food product, process comprising"
Should instead read:
--. . . said food product, the process comprising--

Signed and Sealed this  
Twenty-seventh Day of January, 2026

John A. Squires  
*Director of the United States Patent and Trademark Office*